US011543386B2

(12) United States Patent
Hashime et al.

(10) Patent No.: US 11,543,386 B2
(45) Date of Patent: Jan. 3, 2023

(54) ROPE TESTER, WIRE ROPE ANALYZING APPARATUS AND CONTROL PROGRAM THEREFOR

(71) Applicant: TOKYO ROPE MANUFACTURING CO., LTD., Tokyo (JP)

(72) Inventors: Youta Hashime, Tokyo (JP); Hiroaki Itoi, Tokyo (JP); Ippei Furukawa, Tokyo (JP); Youhei Nakamoto, Tokyo (JP)

(73) Assignee: TOKYO ROPE MANUFACTURING CO., LTD., Tokyo (JP)

( * ) Notice: Subject to any disclaimer, the term of this patent is extended or adjusted under 35 U.S.C. 154(b) by 81 days.

(21) Appl. No.: 16/896,782

(22) Filed: Jun. 9, 2020

(65) Prior Publication Data

US 2020/0300811 A1    Sep. 24, 2020

Related U.S. Application Data

(63) Continuation of application No. PCT/JP2018/045293, filed on Dec. 10, 2018.

(30) Foreign Application Priority Data

Dec. 12, 2017  (JP) .............................. JP2017-237676

(51) Int. Cl.
*G01N 27/82* (2006.01)
*G01N 21/89* (2006.01)
*G01N 21/892* (2006.01)

(52) U.S. Cl.
CPC ......... *G01N 27/82* (2013.01); *G01N 21/8901* (2013.01); *G01N 21/892* (2013.01)

(58) Field of Classification Search
None
See application file for complete search history.

(56) References Cited

U.S. PATENT DOCUMENTS

2019/0063903 A1*  2/2019  Dou ...................... G01B 7/107

FOREIGN PATENT DOCUMENTS

| CN | 101416050 A | 4/2009 |
| CN | 104515777 A | 4/2015 |

(Continued)

OTHER PUBLICATIONS

CN Office Action for corresponding CN Patent Application No. 201880079372.4 dated Oct. 10, 2022, 13 pgs.; Corresponding English Language Translation, 20 pgs.

*Primary Examiner* — Jas A Sanghera
(74) *Attorney, Agent, or Firm* — Dickinson Wright PLLC (57) ABSTRACT

A rope tester to ascertain the condition of a wire rope in advance without increasing workload, Including a magnetization detector having a magnetizer for generating a magnetic force, and a detector for detecting a change in magnetism produced in a wire rope magnetized by the magnetic force generated by the magnetizer; a digital camera, which is provided a predetermined distance away from the magnetization detector along the traveling direction of the wire rope, for imaging the wire rope; and a controller, which is connected to the magnetization detector and to the digital camera, for detecting the location of a defect in the wire rope based on a change in magnetism detected by the magnetization detector, and outputting a drive signal that actuates the digital camera at a timing at which the defect location arrives at the location at which the digital camera is installed.

2 Claims, 4 Drawing Sheets

(56) References Cited

FOREIGN PATENT DOCUMENTS

| CN | 105293242 | A | 2/2016 |
|----|-----------|---|--------|
| JP | 2009012903 | A | 1/2009 |
| JP | 3156764 | U | 1/2010 |
| JP | 2011105495 | A | 6/2011 |
| JP | WO2013145823 | A1 | 12/2015 |

* cited by examiner

ROPE TESTER, WIRE ROPE ANALYZING APPARATUS AND CONTROL PROGRAM THEREFOR

CROSS REFERENCE TO RELATED APPLICATIONS

This application is a Continuation Application of PCT International Application No. PCT/JP2018/045293 filed on Dec. 10, 2018, which claims priority to Japanese Patent Application No. 2017-237676 filed on Dec. 12, 2017, the entire disclosures of the applications being considered part of the disclosure of this application and hereby incorporated by reference.

TECHNICAL FIELD

The present invention relates to a rope tester for inspecting a wire rope. The invention further relates to a wire rope analyzing apparatus and a control program for this apparatus.

BACKGROUND OF THE INVENTION

A wire rope must be inspected periodically. For example, in the inspection of a wire rope for elevators, an inspector is dispatched to a building or the like in which an elevator has been installed, and the wire rope for the elevator is inspected on site by the inspector.

Japanese Patent Application (Laid-Open No. 2009-12903) discloses an inspection apparatus which, using a video signal obtained by imaging a wire rope for an elevator, detects whether a strand has a predetermined number of traces of wear of a predetermined size or a predetermined length.

If a location at which a trace of wear has occurred can be identified beforehand using a video signal, subsequent inspection by a worker will proceed smoothly. According to the Japanese Patent Application noted above, however, whether a trace of wear is present is detected by image processing (pattern recognition). If the wire rope is unclean, the video will be indistinct and there is a high likelihood that detection of traces of wear based on image processing will be difficult. Patent Document 1 describes also the cleaning of a wire rope in order to obtain a distinct video. However, since this requires cleaning the wire rope prior to imaging whenever the wire rope is imaged and to apply grease or the like upon completion of imaging, an increase in workload is the result.

BRIEF DESCRIPTION OF THE INVENTION

An object of the present invention is to enable the condition of a wire rope to be ascertained in advance without an increase in workload.

A rope tester according to the present invention is for inspecting a wire rope traveling at a predetermined speed and comprises: a magnetization detector including a magnetizer for generating a magnetic force, and a detector for detecting a change in magnetism produced in the wire rope magnetized by the magnetic force generated by the magnetizer; an imaging device, which is provided a predetermined distance away from the magnetization detector along the traveling direction of the wire rope, for imaging the wire rope; and a controller, which is connected to the magnetization detector and to the imaging device, for detecting a defect location on the wire rope based on a change in magnetism detected by the magnetization detector, and outputting a drive signal that actuates the imaging device at a timing at which the defect location arrives at the location of installation of the imaging device.

The magnetization detector is, for example, capable of producing an output signal representing a voltage value that is based on a change in magnetization, wherein an output signal (voltage value) that is indicative of the location of a defect takes on a value larger than that of an output signal indicative of a defect-free location. The controller typically detects the location of a defect by discriminating an output signal that exceeds a predetermined threshold value.

In accordance with the present invention, the location of a defect, on a wire rope that travels at a predetermined speed, is detected based on a change in magnetization detected by a magnetization detector, and the defect location is imaged by an imaging device. Since the imaging device is provided a predetermined distance away from the magnetization detector along the direction of travel of the wire rope, the location of the defect on the wire rope first passes by the magnetization detector and then arrives at the imaging device upon the elapse of a predetermined period of time. Because the imaging device is timed to be actuated by the controller when the defect location reaches the location at which the imaging device is installed, the defect location detected by the magnetization detector can be imaged correctly by the imaging device. Since an image is captured where the defect location was detected by the magnetization detector, the defect is imaged in a pinpoint fashion and the condition of the wire rope can be ascertained correctly and in detail.

In an embodiment, the controller includes an input unit for accepting an input of a predetermined traveling speed of the wire rope and an input of distance representing a predetermined spacing between the magnetization detector and the imaging device; and a delay time calculating circuit for calculating a delay time, which specifies a timing at which the drive signal is to be output, using the traveling speed and the distance representing the predetermined spacing that are accepted from the input unit. The signal that drives the imaging device is output from the controller at such timing that the delay time calculated by the delay time calculating circuit has elapsed from the timing of detection of the defect by the magnetization detector. The delay time is calculated based on the entered traveling speed of the wire rope and distance representing the predetermined spacing between the magnetization detector and the imaging device. Therefore, even if there is a difference in the traveling speed of the wire rope and in the distance representing the predetermined spacing between the magnetization detector and the imaging device (for example, the traveling speed of a wire rope for an elevator will differ for every elevator), it is possible to calculate a delay time for imaging a defect location correctly in pinpoint fashion.

If the distance between the magnetization detector and the imaging device is a fixed distance, then it will suffice to input only the traveling speed of the wire rope to the input unit. Data representing the fixed distance between the magnetization detector and the imaging device may be stored in a storage device in advance.

Preferably, the controller includes first recording controller for recording, in a storage device at predetermined time intervals in a time series, the output signal produced by the magnetization detector; and second recording controller for recording image data, which is output from the imaging device, in a storage device, inclusive of order of image data capture. The recording of the order in which the image data is captured may be based on the order in which the image data is recorded in the storage device, or may be based on assignment of data, which represents order, to file names, header information or the like. Both the output signal produced by the magnetization detector recorded in the storage device by the first recording controller and the image data recorded in the storage device by the second recording controller can be utilized to ascertain the condition of the wire rope.

The present invention provides also a wire rope analyzing apparatus to which are applied the output signal from the above-mentioned magnetization detector and the image data from the imaging device, recorded by the rope tester. The wire rope analyzing apparatus according to the present invention comprises: a graph display control circuit for displaying a graph in which the horizontal axis is a plot of wire rope position and the vertical axis is a plot of the output signal produced by the magnetization detector; and a wire rope image display control circuit for displaying a wire rope image, which is represented by the image data, in association with a graph value, which indicates the defect location, in the graph representing the output signal displayed by the graph display control circuit.

Since the output signal produced by the magnetization detector is stored in a storage device at predetermined time intervals in a time series and the wire rope travels at a predetermined speed, each output signal can be associated with the horizontal axis (a wire rope position) of the graph.

The image data recorded in the storage device is created by imaging a defect location in pinpoint fashion, and the image data output from the imaging device is recorded, inclusive of the order in which the image data is captured, in the storage device. The image data, therefore, can be correctly associated with each graph value indicating a defect location included in the graph of the output signal. (With regard to each graph value indicating a defect location, it will suffice to associate the image data in chronological order from an inspection-start location to an inspection-end location.) Not only is the location of a defect in the wire rope and the extent of the defect (the magnitude of the output signal) ascertained from the graph of the output signal, but it is also possible to check the appearance of the defect from the image. In a case where only the magnetization detector is used, a more specific condition of the wire rope, such as breakage intervals and number of breaks, which are difficult to ascertain, maybe checked in detail.

The present invention provides also a program for controlling the wire rope analyzing apparatus described above.

DETAILED DESCRIPTION OF THE INVENTION

Figure 1:
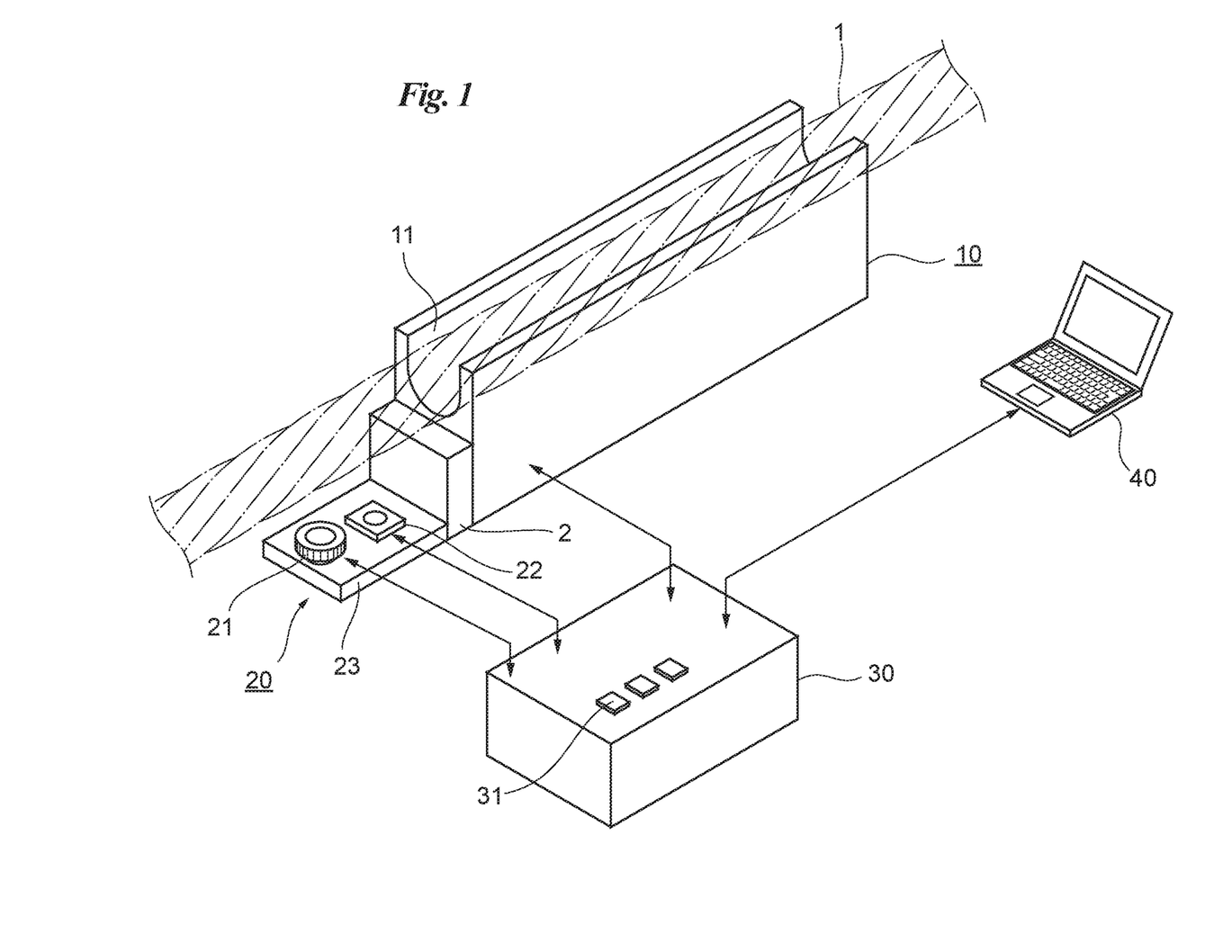
FIG. 1 is a perspective view block diagram schematically illustrating the overall configuration of a rope tester system.
Figure 2:
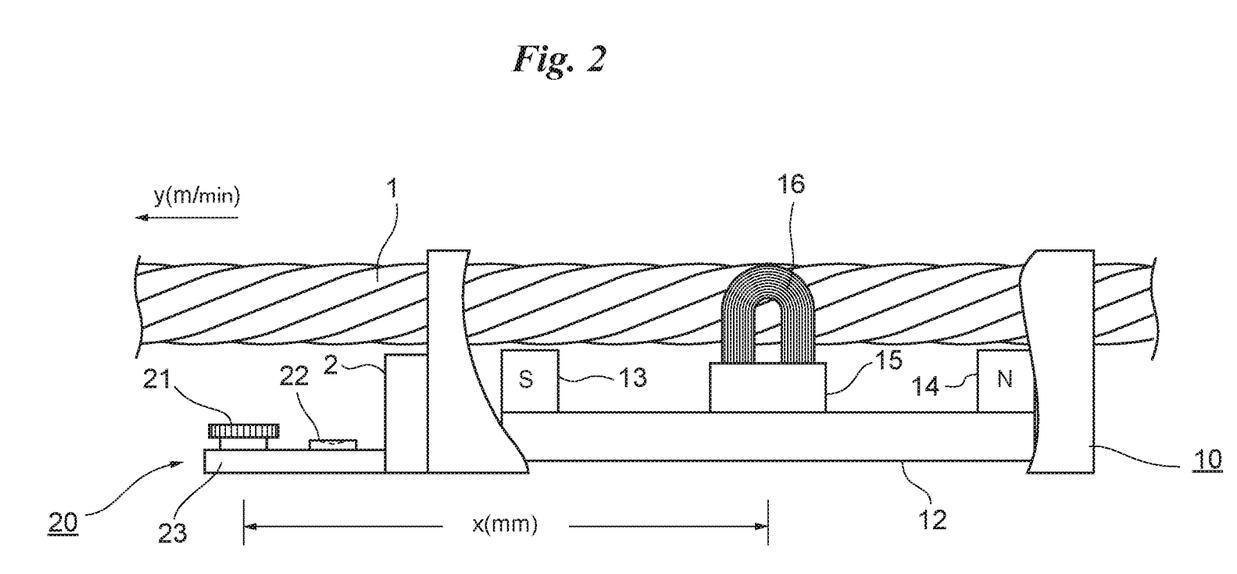
FIG. 2 is a block diagram schematically illustrating a magnetization detector and an imaging unit from the side thereof.

FIG. 1 is a perspective view illustrating the overall configuration of a rope tester system in a schematic block illustration, and FIG. 2 is a block diagram schematically illustrating, from a side thereof, a magnetization detector and an imaging unit, described below, which constitutes the rope tester. FIG. 2 shows the internal structure of the magnetization detector.

The rope tester includes a magnetization detector 10, an imaging unit 20, a controller 30, and a computer unit 40.

The magnetization detector 10 magnetizes a portion of a wire rope 1, for an elevator which is to be inspected, thereby forming a magnetic circuit that includes a portion of the elevator wire rope 1. By using the magnetic flux or a change in the magnetic flux, the magnetization detector 10 observes a change in magnetic resistance produced by the presence of a defect in the elevator wire rope 1.

With reference to FIG. 1, the magnetization detector 10 includes a wire rope passage recess 11 having a substantially semicircular transverse cross-section and extending in one direction. The wire rope 1, which has circular cross-section, passes through the interior of the wire rope passage recess 11. The length of the magnetization detector 10 (wire rope passage recess 11) in the longitudinal direction thereof is 160 mm, by way of example.

With reference to FIGS. 1 and 2, the magnetization detector 10 includes, provided below the wire rope passage recess 11, a yoke 12 having the shape of a rectangular parallelepiped; a pair of magnets 13, 14 fixed to the top of the yoke 12 on respective ones of both sides thereof; a coil base 15 placed between the pair of magnets 13, 14 and fixed to the top of the yoke 12 with a space between itself and each of the magnets 13, 14; and a detection coil 16 fixed to the top of the coil base 15. The detection coil 16 is bent into a U-shaped configuration along the wire rope passage recess 11 in order to inspect a major portion of the outer peripheral surface of the wire rope 1. A magnetic circuit is formed by the magnets 13, 14, the yoke 12 and the portion of the wire rope 1 within the range thereof sandwiched between the magnets 13, 14.

If the wire rope 1 is damaged (has a deficiency), the cross-sectional area of the wire rope 1 is reduced at the location of the damage and the magnetic resistance in the magnetic circuit increases. The increase in the magnetic resistance reduces the magnetic flux in the above-mentioned magnetic circuit. Since the magnetic flux that flows through the magnetic circuit is interlinked with the detection coil 16, an electromotive force is produced in the detection coil 16 in accordance with a change in the magnetic flux, and a voltage signal is output. The damage that has occurred in the wire rope 1 can be evaluated quantitatively based on the voltage signal output from the detection coil 16.

If foreign matter such as accumulation of iron powder or the like attaches itself to the wire rope 1, the magnetic flux changes at this location as well and an electromotive force is produced in the detection coil 16. Since the location where the iron powder has accumulated increases the cross-sectional area, an electromotive force having a polarity different from that of an electromotive force produced in a case where the wire rope 1 has the above-mentioned damage is produced in the detection coil 16. The voltage signal output from the detection coil 16 can also be used to detect foreign matter attached to the wire rope 1.

In the description set forth below, damage (a deficiency) in the wire rope 1 and attachment of foreign matter to the wire rope 1 will be collectively referred to as a "defect".

The imaging unit 20 is equipped with a digital camera 21 and a light source 22 that are fixed on a pedestal 23. The digital camera 21 and light source 22 both point in the direction of the wire rope 1 so that the surface of the wire rope 1 is illuminated brightly by light source 22 and can be imaged by the digital camera 21.

An attachment 2 is provided between the magnetization detector 10 and the imaging unit 20. The magnetization detector 10 and imaging unit 20 can be integrated via the attachment 2.

The above-described magnetization detector 10, digital camera 21 and light source 22, as well as the computer unit 40 described below, are connected to the controller 30 by signal lines.

The controller 30, which includes such components as a CPU (Central Processing Unit), a memory, a hard disk and a communication interface (none of which are shown), receives and records the voltage signal output from the magnetization detector 10 (detection coil 16), supplies power to and drives (instructs image capture by) the digital camera 21, receives and records image data output from the digital camera 21, supplies power to the light source 22 and transmits data to the computer unit 40.

The memory possessed by the controller 30 records the voltage signal output from the magnetization detector 10 (detection coil 16), the image data transmitted from the digital camera 21, and setting data [date and time of measurement, traveling speed (rope speed) of the wire rope 1, the diameter of the wire rope 1, a set value of gain, a threshold value (discrimination level) for performing defect discrimination, and the distance between the detection coil 16 and the digital camera 21], etc. An input device (input button) 31 possessed by the controller 30 is used to input the setting data. The controller 30 further includes an interface (not shown) for loading a removable memory card. Data that has been stored in the memory of the controller 30 also can be recorded on (transferred to) the memory card.

Furthermore, as will be described below in detail, the controller 30 outputs a warning (such as by lighting a lamp or issuing a buzzer tone) when it discriminates the presence of a defect (when the voltage signal exceeds the threshold value) using the voltage signal that is output from the detection coil 16.

The computer unit 40 has such components as a CPU (Central Processing Unit), an input unit, and a display device. Installed in the computer unit 40 is a program for performing analysis of the wire rope 1 using data transmitted from the controller 30 through a signal line or data recorded on the memory card in the controller 30. The details of processing (of a display screen) by the analytical program in the computer unit 40 will be described later.

Figure 3:
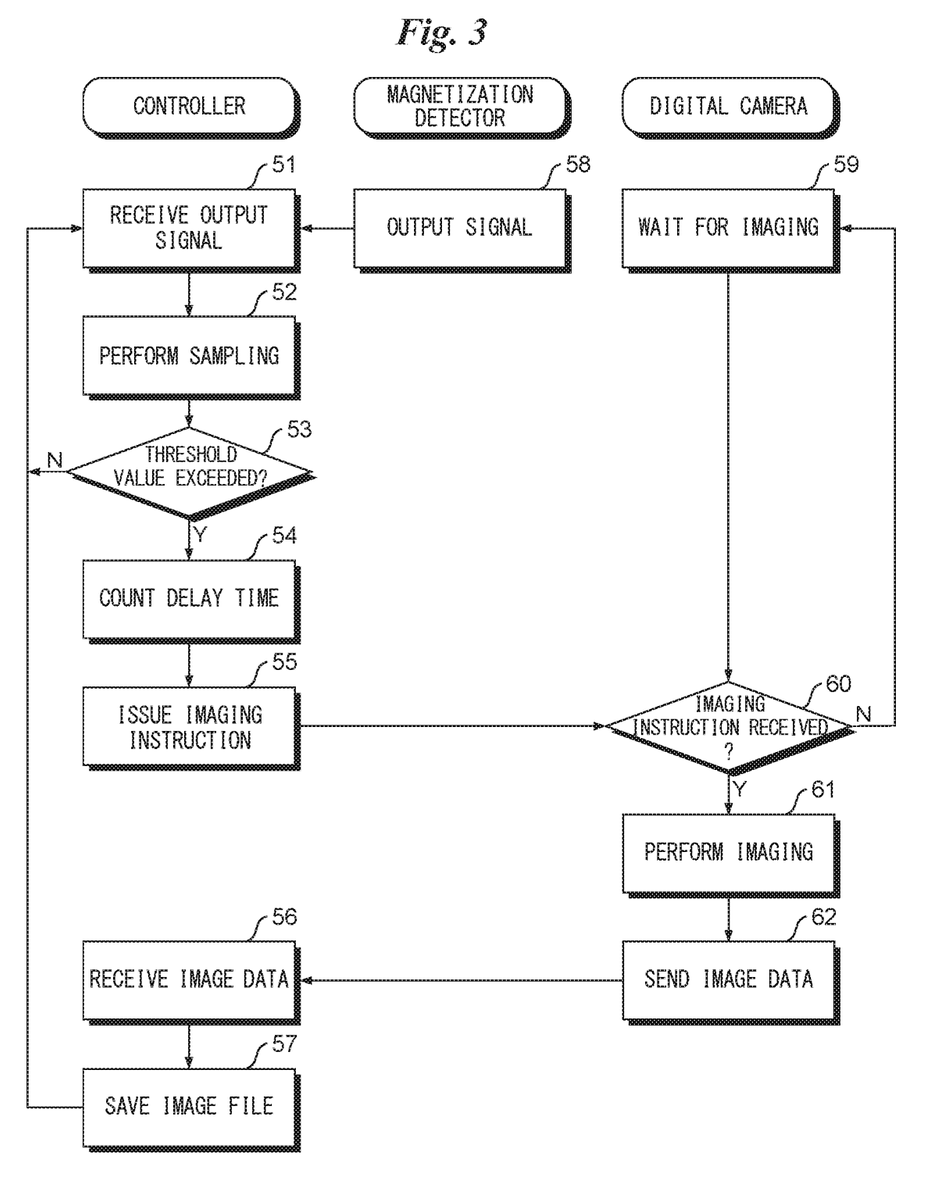
FIG. 3 is a flowchart illustrating the flow of operation of the rope tester system.

FIG. 3 is a flowchart illustrating the flow of operation of the controller 30, magnetization detector 10 (detection coil 16) and digital camera 21.

In general, the wire rope 1 is produced by twisting together a plurality of strands and the surface thereof has a helical unevenness. In terms of structure, therefore, the cross-sectional area is not uniform along the longitudinal direction. As a consequence, an output signal (voltage signal) is produced by the magnetization detector 10 (detection coil 16) at all times. The output signal from the magnetization detector 10 is applied to the controller 30 through a signal line (steps 58, 51), as mentioned above.

The output signal from the magnetization detector 10 received by the controller 30 is sampled in the controller 30 at predetermined time intervals of, say, one millisecond, and the sampled values (digital data representing voltage values) are recorded in memory (step 52). In general, the output signal from the magnetization detector 10 is amplified in the controller 30 using a preset gain, and the amplified output signal is sampled.

The controller 30 compares each voltage value (sampled value), which has been recorded in memory, with a predetermined threshold value (step 53). If the voltage value is equal to or lower than the threshold value, the controller 30 does not execute any particular processing ("NO" at step 53).

The greater the degree of damage the wire rope 1 sustains, the larger the output signal (voltage value) produced by the magnetization detector 10. If the wire rope 1 is not damaged but iron powder from the wire rope 1 or from a sheave with which the wire rope 1 is engaged has accumulated on the surface of the wire rope 1, then, in this case as well, the magnetic resistance in the above-mentioned magnetic circuit will fluctuate and so will the output signal produced by the magnetization detector 10. If a voltage value that exceeds the threshold value is sensed, the controller 30 counts a predetermined delay time (described in detail below) from the moment the voltage value is sensed and sends a drive signal (imaging instruction signal) to the digital camera 21 at the moment the delay time elapses ("YES" at step 53; steps 54, 55).

The digital camera 21 is constantly waiting for the imaging instruction from the controller 30 (step 59; "NO" at step 60) and executes imaging at the moment it receives the imaging instruction signal from the controller 30 ("YES" at step 60; step 61). Image data acquired by imaging representing the imaged portion of the wire rope 1 is sent from the digital camera 21 to the controller 30 through the signal line (step 62).

Upon receiving the image data sent from the digital camera 21, the controller 30 records (saves) the received image data in memory (steps 56, 57). The image data can be recorded in memory in any file format (jpeg, gif, raw, etc.).

Data specifying the order in which imaging was performed can be attached to each image file recorded in memory. For example, by utilizing a timekeeping function of the controller 30, data specifying the order in which imaging was performed may be attached by including the imaging time in the file name of the image file recorded in memory, or a consecutive number may be included in the file name of the image file recorded in memory. Data specifying the order in which imaging was performed may also be recorded in header information of the image file rather than in the file name of the image file.

It is possible to specify the imaging order of an image file recorded in memory also by using the order in which the image file was recorded in memory. For example, it will suffice to record each image file in memory so as to maintain a first-in, first-out (FIFO) structure.

The delay time mentioned above will be described with reference to FIG. 2.

In the rope tester, as illustrated in FIG. 2, with the direction in which the wire rope 1 travels serving as a reference, the magnetization detector 10 and the imaging unit 20 are respectively provided upstream and downstream of the wire rope 1 in terms of the traveling direction thereof. Since the traveling wire rope 1 is inspected continuously using the fixedly installed rope tester system, the location of a defect on the wire rope 1 first passes by the detection coil 16 and then passes by the location at which the digital camera 21 is installed.

Let y(m/min) and x(mm) represent the traveling speed of the wire rope 1 and the distance between the detection coil 16 and the digital camera 21, respectively. Since the speed of travel of the defect location of the wire rope 1 is equal to the traveling speed of the wire rope 1, the speed of travel of the defect location is represented by the following equation expressed in units of mm/s:

$$y(\text{m/min})=1000/60 \cdot y(\text{mm/s}) \quad \text{Eq. 1}$$

If the defect location of the wire rope 1 passes by the detection coil 16 and travels to a point directly above the digital camera 21 after t(s), the following equation will hold:

$$1000/60 \cdot y \cdot t = x$$

$$t=(x/y) \cdot (60/1000) \quad \text{Eq. 2}$$

By way of example, if we let x=100 mm be the distance between the detection coil 16 and the digital camera 21 and let y=16 (m/min) be the traveling speed of the wire rope 1, then the following value is calculated from Eq. 2:

$$t=(100/16) \cdot (60/1000)=0.375 \text{ (s)}.$$

That is, 0.375 (s) after the defect location of the wire rope 1 passes by the detection coil 16, the defect location arrives at the position where the digital camera 21 has been installed. Using the set traveling speed y of the wire rope 1 and the distance x between the detection coil 16 and the digital camera 21, the controller 30 calculates the above-mentioned delay time (calculates and records it in memory in advance). The calculated delay time is used to control the timing at which the drive signal is sent to the digital camera 21. By using the clock signal of the CPU possessed by the controller 30, for example, the controller 30 is capable of outputting the drive signal to the digital camera 21 upon elapse of the predetermined delay time from the moment of defect detection (detection of an output signal that exceeds the threshold value).

Figure 4:
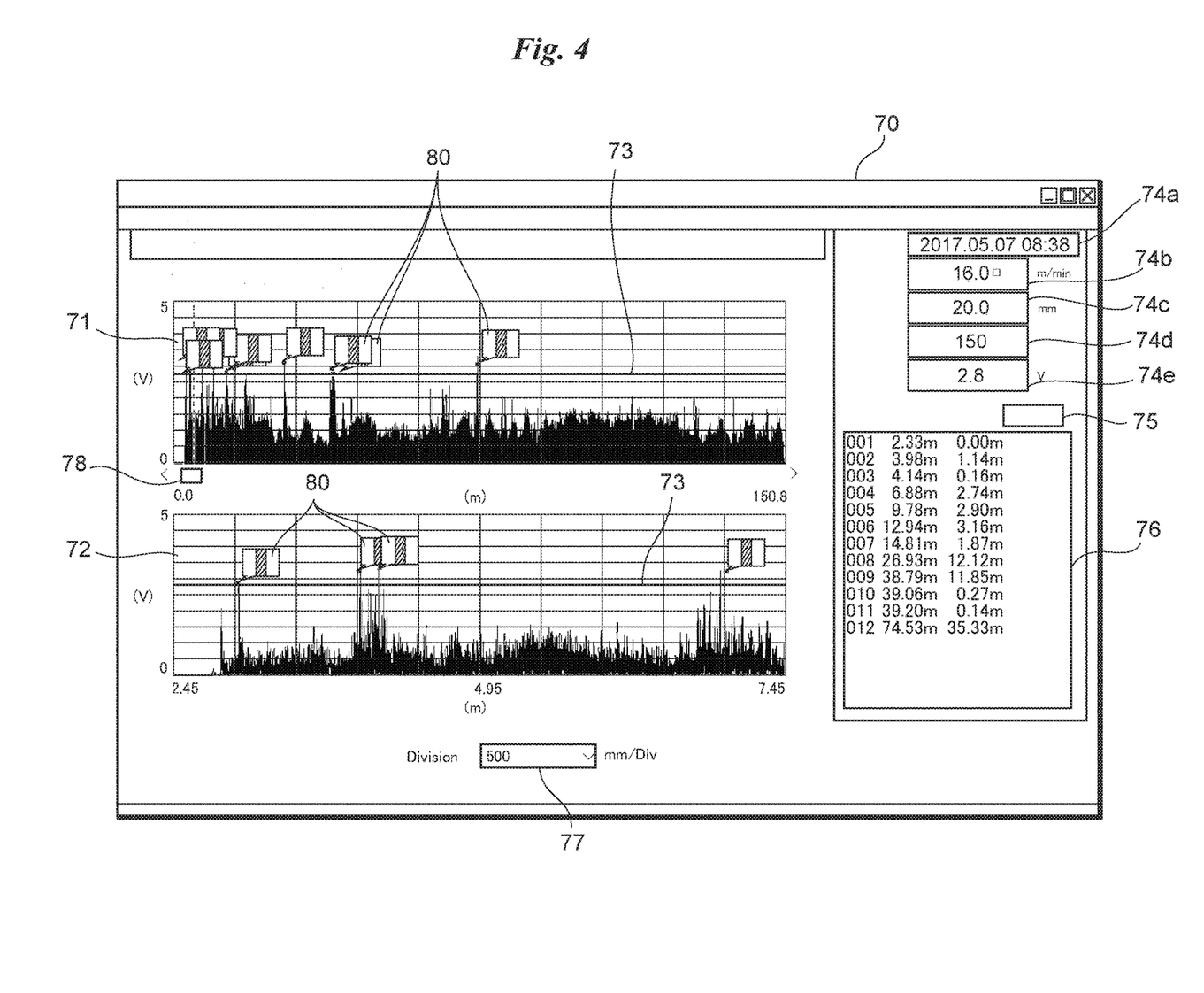
FIG. 4 illustrates an exemplary screen of inspection results displayed on a screen in the rope tester system.

FIG. 4 illustrates the screen of a display device on the computer unit 40. This shows an example of a screen displayed by an analytical program that has been installed in the computer unit 40. Of course, the dedicated display control circuit or circuits may be provided in the computer unit 40.

The output signal (voltage value) that is output from the magnetization detector 10 (detection coil 16) at predetermined times, and an image file that includes image data representing the wire rope 1 imaged by the digital camera 21, and which have been recorded in the memory of controller 30, are applied to the computer unit 40 through a signal line or via a portable memory card. Data representing the measurement date and time at which the wire rope 1 was inspected, the traveling speed (rope speed) of the wire rope 1, the rope diameter, the gain setting and the discrimination level (threshold value) also is applied to the computer unit 40 through the signal line or portable memory card.

When the analytical program is launched in the computer unit 40, an analytical window 70 shown in FIG. 4 is displayed on the display screen of the display device on the computer unit 40.

Provided on the right side of the analytical window 70 are a measurement date and time display field 74a, a rope speed display field 74b, a rope diameter display field 74c, a gain setting display field 74d, and a discrimination level display field 74e. In the initial state, values that have been set in the controller 30 are displayed in the display fields 74a to 74e.

Two output signal graph display fields 71, 72, in each of which the horizontal axis is a plot of position (m) of the wire rope 1 and the vertical axis is a plot of voltage value (V), are displayed, the former displays above the latter, on the left side of the analytical window 70.

In the output signal graph display fields 71, 72, the graph values representing the output signals (voltage values) output from the magnetization detector 10 (detection coil 16) are indicated by the lengths of the vertical straight lines. As mentioned above, the output signal from the magnetization detector 10 is sampled at predetermined time intervals, e.g., every millisecond, in order (in a time series). Further, the traveling speed (rope speed) of the wire rope 1 is known. Accordingly, each of the sampled multiplicity of output signals (multiplicity of voltage values) that have been sampled can be associated with a position on the wire rope 1 (distance from the inspection starting position, where the inspection starting position is assumed to be 0.0 m), as a result of which an output-signal graph, in which the position (m) on the wire rope 1 is plotted along the horizontal axis and the voltage value (V) is plotted along the vertical axis, is created by the analytical program.

Output signals extending over the entire inspection length of the wire rope 1 are displayed in the form of the graph in the output signal graph display field 71. In the example shown in FIG. 4, the entire inspection length of the wire rope 1 is 150.8 m. A range from the inspection starting position (0.0 m) to 150.8 m, which is the entire inspection length, is indicated along the horizontal axis of the output signal graph display field 71, in the upper display field. On the other hand, the output signal graph display field 72, in the lower display field, indicates, in enlarged form, a range which is a portion of the horizontal axis of the upper output signal graph display field 71. By using a display device (a mouse or the like) to move, to the left or right, a rectangular slider 78 displayed below the upper output signal graph display field 71, a range of enlargement can be selected. The enlargement ratio (enlargement width) can be changed and is entered in an enlargement ratio input field 77 displayed at a central location below the analytical window 70. The lateral width of the rectangular slider 78 expands and contracts in conformity with the size of the enlargement ratio.

Further, a line 73 indicating the threshold value (discrimination level) may be displayed in a different color (the color red, for example) in the output signal graph display fields 71, 72, and spikes in the graph representing output values that exceed the threshold value line 73 are marked (a red circle mark, for example, is displayed at each such spike in the graph).

When a discrimination button 75 provided on the right side of the analytical window 70 is clicked, positions on the wire rope 1 at which the output signals of voltage values exceeding the threshold value have been detected, namely defect positions, are displayed in a list in a list display field 76. For every detected defect location, a consecutive number, distance from the inspection starting position, and distance from the immediately preceding defect location are displayed in the list display field 76.

Further displayed in the output signal graph display fields 71, 72 are thumbnail images 80 that correspond to respective spikes in the graph representing the output values that exceed the threshold value line 73. The thumbnail images 80 are images of portions of the wire rope 1 imaged by the digital camera 21 when output signals that exceed the threshold value have been detected. Processing for creating image data, which represents the thumbnail images 80, from the image data that is output from the digital camera 21 is executed by the computer unit 40 (analytical program). Thumbnail image data may of course be created in the digital camera 21 or controller 30.

Since the wire rope 1 is inspected from the inspection starting position to the inspection end position, the graph values of the multiplicity of output signals displayed in the output signal graph display fields 71, 72 are arrayed in a time series from left to right. Further, as described above, the imaging of the wire rope 1 by the digital camera 21 is performed when a defect has been detected (when a voltage signal exceeding the threshold value has been detected) based upon the output signal from the magnetization detector 10 (detection coil 16). Furthermore, each image file includes data specifying the order in which imaging was performed, as mentioned above. Accordingly, by associating the image files in order from left to right, starting from the oldest of the image files captured, with respective ones of the graphed values of the output signals that exceed the threshold value, the graph values representing the output signals of the output values that exceed the threshold value line 73 can be accurately associated with respective ones of the images 80 of the wire rope 1 representing the defect locations at which the output signals of these voltage values have been detected.

It may be arranged so that when a thumbnail image 80 is clicked, an image based on the original image data used when the clicked thumbnail image 80 was created is displayed on the display screen (an enlarged display). This enables the appearance of the defect location to be checked in detail on the display screen. Further, it can be reliably determined whether the defect is the result of damage or attachment of foreign matter. Furthermore, the image showing the appearance of the defect can be checked in addition to the result of inspection (the graph display) obtained using the magnetization detector 10. In a case where only the magnetization detector 10 is used, therefore, a more specific condition of the wire rope 1, such as breakage intervals and number of breaks, which are difficult to ascertain, can be checked in detail. As a result, the range of the wire rope 1 searched on site for defect locations or the range of the wire rope 1 to be carefully inspected on site can be narrowed down greatly, and highly efficient on-site inspection can be implemented and as such, it is possible to greatly reduce defects from being overlooked in an on-site inspection.

The numerical value representing the threshold value displayed in the discrimination level display field 74e on the right side of the analytical window 70 can be replaced by another numerical value. If a higher numerical value is entered in the discrimination level display field 74e, the threshold value line 73 in the output signal graph display fields 71, 72 moves upward. Since the spikes of the graph that represent the output signals of voltage values that exceed the newly entered threshold value will be marked and the thumbnail images 80 will be displayed in association with the spikes, the number of thumbnail images 80 displayed will generally diminish. That is, only the thumbnail images 80 of locations at which the degree of defect is considered to be large enough will be displayed on the output signal graph display fields 71, 72.

The numerical value (threshold value) in the discrimination level display field 74e can also be replaced by a lower numerical value. With regard to spikes of the graph that represent output signals that exceed the threshold value for the first time owing to the lowering of the threshold value, imaging will not have been performed. It goes without saying, therefore, that thumbnail images 80 cannot be displayed in association with the spikes. However, by setting the threshold value to be set in the controller 30 to a small value beforehand, in general the locations at which defects are discriminated will increase. It goes without saying, therefore, that more locations on the wire rope 1 will be imaged.

In the above-described embodiment, a rope tester for inspecting a single wire rope 1 is illustrated. However, a plurality of wire ropes 1 can be inspected simultaneously by arranging a plurality of magnetization detectors 10 and imaging units 20 in parallel. In this case, output signal graph display fields 71, 72 regarding respective ones of the plurality of wire ropes 1 will be displayed in the analytical window 70 (the analytical window 70 will be created for each wire rope 1).

Further, in the above-described embodiment, an arrangement is illustrated in which the wire rope 1 is imaged from one direction using the single digital camera 21. However, the same location on the wire rope 1 may be imaged from different directions using a plurality of digital cameras 21. This makes it possible to check, by imagery, a broader range or the full range of the wire rope 1 in the circumferential direction thereof.

What is claimed is:

1. A rope tester for inspecting a wire rope traveling at a predetermined speed, comprising:
    a magnetization detector including a magnetizer for generating a magnetic force, and a detector for detecting a change in magnetism produced in the wire rope magnetized by the magnetic force generated by the magnetizer;
    an imaging device, which is provided a predetermined distance away from said magnetization detector along the traveling direction of the wire rope, for imaging the wire rope;
    a controller, which is connected to said magnetization detector and to said imaging device, for detecting a defect location on the wire rope based on a change in magnetism detected by said magnetization detector, and outputting a drive signal that actuates said imaging device at a timing at which the defect location arrives at the location of installation of said imaging device;
    an input unit for accepting an input of a predetermined traveling speed of the wire rope and an input of distance representing a predetermined spacing between said magnetization detector and said imaging device; and
    a delay time calculating circuit for calculating a delay time, which specifies a timing at which the drive signal is to be output, using the traveling speed and the distance representing the predetermined spacing that are accepted from said input unit.

2. A rope tester according to claim 1, wherein said controller includes:
    first recording controller for recording, in a storage device at predetermined time intervals in a time series, the output signal produced by said magnetization detector; and
    second recording controller for recording image data, which is output from said imaging device, in a storage device, inclusive of order of image data capture.

* * * * *